(12) United States Patent
Jeon et al.

(10) Patent No.: US 11,211,659 B2
(45) Date of Patent: Dec. 28, 2021

(54) BATTERY MODULE COMPRISING HOUSING WITH CONNECTOR

(71) Applicant: LG Chem, Ltd., Seoul (KR)

(72) Inventors: Hyun Wook Jeon, Daejeon (KR); Youngsun Yun, Daejeon (KR)

(73) Assignee: LG Chem, Ltd.

( * ) Notice: Subject to any disclaimer, the term of this patent is extended or adjusted under 35 U.S.C. 154(b) by 0 days.

(21) Appl. No.: 16/609,605

(22) PCT Filed: Nov. 13, 2018

(86) PCT No.: PCT/KR2018/013843
§ 371 (c)(1),
(2) Date: Oct. 30, 2019

(87) PCT Pub. No.: WO2019/098653
PCT Pub. Date: May 23, 2019

(65) Prior Publication Data
US 2020/0067035 A1 Feb. 27, 2020

(30) Foreign Application Priority Data
Nov. 16, 2017 (KR) .................. 10-2017-0153330

(51) Int. Cl.
*H01M 50/20* (2021.01)
*H01M 50/543* (2021.01)
(Continued)

(52) U.S. Cl.
CPC ......... *H01M 50/20* (2021.01); *H01M 10/425* (2013.01); *H01M 10/4285* (2013.01);
(Continued)

(58) Field of Classification Search
CPC .. H01M 50/20; H01M 50/502; H01M 50/543; H01M 10/4207; H01M 10/4285;
(Continued)

(56) References Cited

U.S. PATENT DOCUMENTS 8,580,423 B2    11/2013   Kim
9,069,045 B2    6/2015    Lee et al.
(Continued)

FOREIGN PATENT DOCUMENTS

CN    205692891 U    11/2016
CN    106784438 A    5/2017
(Continued)

OTHER PUBLICATIONS

International Search Report including Written Opinion for Application No. PCT/KR2018/013843, mailed Feb. 26, 2019, pp. 1-8.
(Continued)

*Primary Examiner* — Magali P Slawski
*Assistant Examiner* — Jessie L. Walls
(74) *Attorney, Agent, or Firm* — Lerner, David, Littenberg, Krumholz & Mentlik, LLP

(57) ABSTRACT

A battery module includes: a lower housing in which a plurality of secondary battery cells are housed; an upper housing coupled to a cover of the lower housing to cover the plurality of secondary replaceable cells; a female connector detachably installed in at least one of the lower housing and the upper housing; and a wiring harness electrically connected to the connector and the plurality of secondary battery cells.

The connector may include a body provided with a plurality of terminals, a bottom surface of the body may be spaced apart from an outer surface of the at least one housing such that a space may be defined between the outer surface of the at least one housing and the bottom surface, and both side surfaces of the body may be securely connected to the outer surface of the at least one housing.

12 Claims, 11 Drawing Sheets

(51) Int. Cl.
  *H01M 10/42* (2006.01)
  *H01R 13/627* (2006.01)
  *H01R 13/64* (2006.01)
  *H01M 50/502* (2021.01)

(52) U.S. Cl.
  CPC ....... *H01M 50/502* (2021.01); *H01M 50/543* (2021.01); *H01R 13/627* (2013.01); *H01R 13/64* (2013.01)

(58) Field of Classification Search
  CPC ...... H01M 10/425; Y02E 60/10; H01R 13/64; H01R 13/627
  See application file for complete search history.

(56) References Cited

U.S. PATENT DOCUMENTS

| | | | |
|---|---|---|---|
| 9,444,080 B2 | 9/2016 | Kim | |
| 9,620,761 B2 | 4/2017 | Smith et al. | |
| 2001/0012578 A1* | 8/2001 | Vackar | H01M 50/10 429/100 |
| 2005/0042936 A1 | 2/2005 | Perry | |
| 2005/0227519 A1* | 10/2005 | Perry | H01R 13/629 439/157 |
| 2010/0124693 A1* | 5/2010 | Kosugi | H01M 10/482 429/92 |
| 2011/0195285 A1 | 8/2011 | Shin et al. | |
| 2011/0300433 A1 | 12/2011 | Kim | |
| 2012/0003505 A1 | 1/2012 | Kim | |
| 2012/0315522 A1 | 12/2012 | Shin et al. | |
| 2014/0315441 A1* | 10/2014 | Kinoshita | H01M 10/48 439/627 |
| 2017/0062780 A1 | 3/2017 | Bae | |
| 2017/0263909 A1* | 9/2017 | Shimizu | H01M 50/502 |
| 2018/0190965 A1 | 7/2018 | Lee et al. | |
| 2018/0342775 A1* | 11/2018 | Sei | H01M 10/482 |
| 2019/0190203 A1* | 6/2019 | Sawada | H01R 13/631 |
| 2021/0175586 A1 | 6/2021 | Haruki et al. | |

FOREIGN PATENT DOCUMENTS

| | | |
|---|---|---|
| EP | 2139056 A1 | 12/2009 |
| JP | H11345653 A | 12/1999 |
| JP | 2011119284 A | 6/2011 |
| JP | 2013525945 A | 6/2013 |
| JP | 2014203628 A | 10/2014 |
| JP | 2016100212 A | 5/2016 |
| KR | 20110133807 A | 12/2011 |
| KR | 20120002874 A | 1/2012 |
| KR | 20120016351 A | 2/2012 |
| KR | 20150052611 A | 5/2015 |
| KR | 20160030353 A | 3/2016 |
| KR | 20170050511 A | 5/2017 |
| KR | 20170073468 A | 6/2017 |
| WO | 2013069525 A1 | 5/2013 |
| WO | 2015029619 A1 | 3/2015 |
| WO | 2017131182 A1 | 8/2017 |
| WO | 2018079460 A1 | 5/2018 |

OTHER PUBLICATIONS

Extended European Search Report including Written Opinion for Application No. EP18879543.9, dated May 29, 2020, pp. 1-6.
Indian Examination Report for Application No. 201917047298 dated Jul. 27, 2021, 2 Pages.
Chinese Search Report for Application No. 201880028069.1, dated Sep. 12, 2021, 3 pages.

* cited by examiner

BATTERY MODULE COMPRISING HOUSING WITH CONNECTOR

CROSS-REFERENCE TO RELATED APPLICATION(S)

This application is a national phase entry under 35 U.S.C § 371 of International Application No. PCT/KR2018/013843, filed Nov. 13, 2018, which claims priority from Korean Patent Application No. 10-2017-0153330 filed on Nov. 16, 2017, the entire contents of which are incorporated herein by reference.

TECHNICAL FIELD

The present invention relates to a battery module including a housing with a connector.

BACKGROUND ART

Generally, a battery module is provided with a plurality of electrical wires electrically connected to a secondary battery. These wires may typically be provided in the form of a wiring harness connected to a connector.

Here, the connector may be electrically connected to an external device so as to provide electrical energy generated by the battery module to the external device, and the battery module may be electrically connected to an inspecting device during a manufacturing process in order to detect secondary battery characteristics of the battery module.

Such a connector is required to be stably fixed to the battery module.

DISCLOSURE

Technical Problem

The present invention has been made in an effort to provide a battery module including a housing with a connector that may be firmly fixed to the housing while minimizing a contact area with the housing of the battery module.

Technical Solution

An aspect of the present invention provides a battery module including: a lower housing in which a plurality of secondary battery cells are housed; an upper housing coupled to a cover of the lower housing to cover the plurality of secondary battery cells; a female connector detachably installed in at least one of the lower housing and the upper housing; and a wiring harness electrically connected to the connector and the plurality of secondary battery cells. The connector may include a body provided with a plurality of terminals. A bottom surface of the body may be spaced apart from an outer surface of the at least one housing such that a space may be defined between the outer surface of the at least one housing and the bottom surface, and both side surfaces of the body may be securely connected to the outer surface of the at least one housing.

The at least one housing may be the upper housing, and an entirety of the bottom surface of the connector may be spaced apart from the outer surface of the upper housing.

The bottom surface of the connector may be supported by a protruding portion disposed on the outer surface of the upper housing, and a plurality of the protruding portions may be disposed on the outer surface of the upper housing and spaced apart from one another by an arbitrary distance.

When an inspecting jig provided with a pin inserted into the terminal is connected to the connector, a bottom plate of the inspecting jig may be inserted into the space, and the protruding portion may be inserted into a recess portion disposed on the bottom plate. The protruding portion may be straight.

A first groove portion defining a first catching jaw may be disposed on a first side surface of the body, and a first catching protrusion that is supported by the first catching jaw and prevents the connector from moving in one direction as well as a second catching protrusion that is supported by a corner of the connector and prevents movement of the connector with respect to another direction perpendicular to the one direction may both be disposed on the outer surface of the upper housing.

A second groove portion that defines a second catching jaw to which an elastic hook protruding from the outer surface of the upper housing is coupled may be formed in a second side surface of the body.

The at least one housing may be provided with a concave portion disposed between convex portions, and the wiring harness may be fitted within and coupled to the concave portion.

Advantageous Effects

According to an embodiment, a connector may be stably fixed to a housing while minimizing the contact area with the housing without using a separate fastening member.

According to an embodiment, it is possible to insert a jig necessary for inspecting a battery module into a space formed between a connector and a housing, thereby allowing for automated inspection.

DESCRIPTION OF THE DRAWINGS

FIG. 3 illustrates an enlarged perspective view of portion III shown in

FIG. 1.

MODE FOR INVENTION

Figure 1:
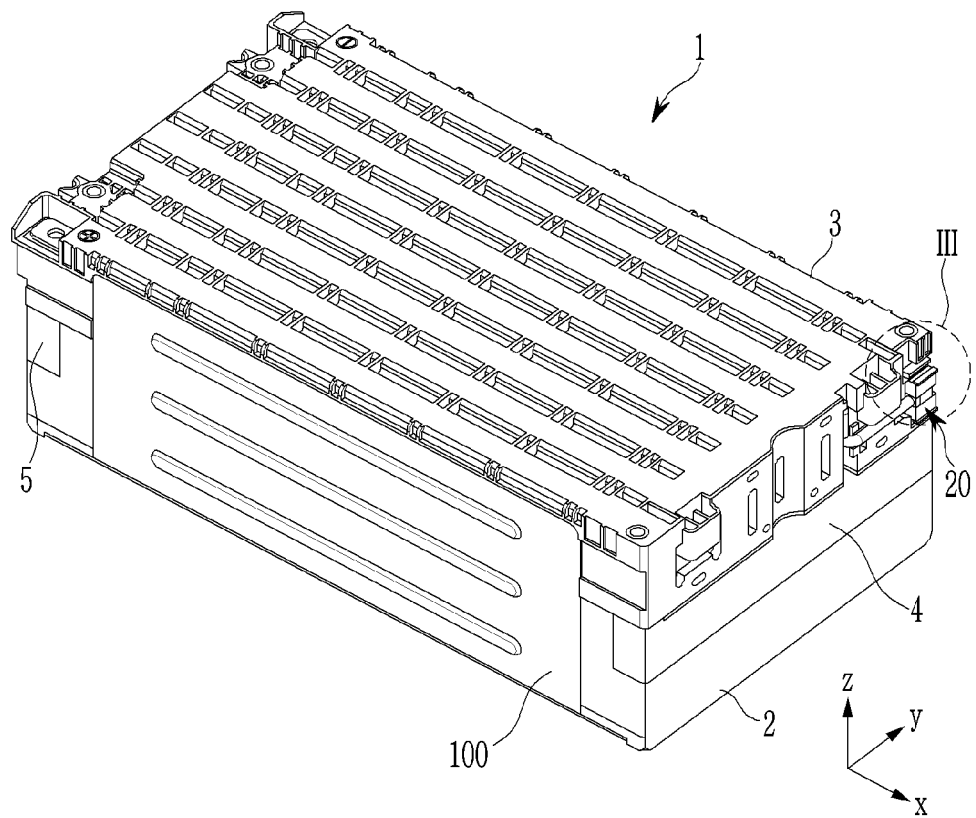
FIG. 1 schematically illustrates a perspective view of a battery module according to an embodiment of the present invention.

The present invention will be described more fully hereinafter with reference to the accompanying drawings, in which an exemplary embodiment of the invention is shown. As those skilled in the art would realize, the described embodiment may be modified in various different ways, all without departing from the spirit or scope of the present disclosure.

Parts that are irrelevant to the description will be omitted to clearly describe the present disclosure, and like reference numerals designate like elements throughout the specification.

Throughout this specification and the claims that follow, when it is described that an element is "coupled" to another element, the element may be "directly coupled" to the other element or "electrically coupled" to the other element through a third element. In addition, unless explicitly described to the contrary, the word "comprise" and variations such as "comprises" or "comprising" will be understood to imply the inclusion of stated elements but not the exclusion of any other elements.

Hereinafter, embodiments will be described with reference to the accompanying drawings.

Figure 2:
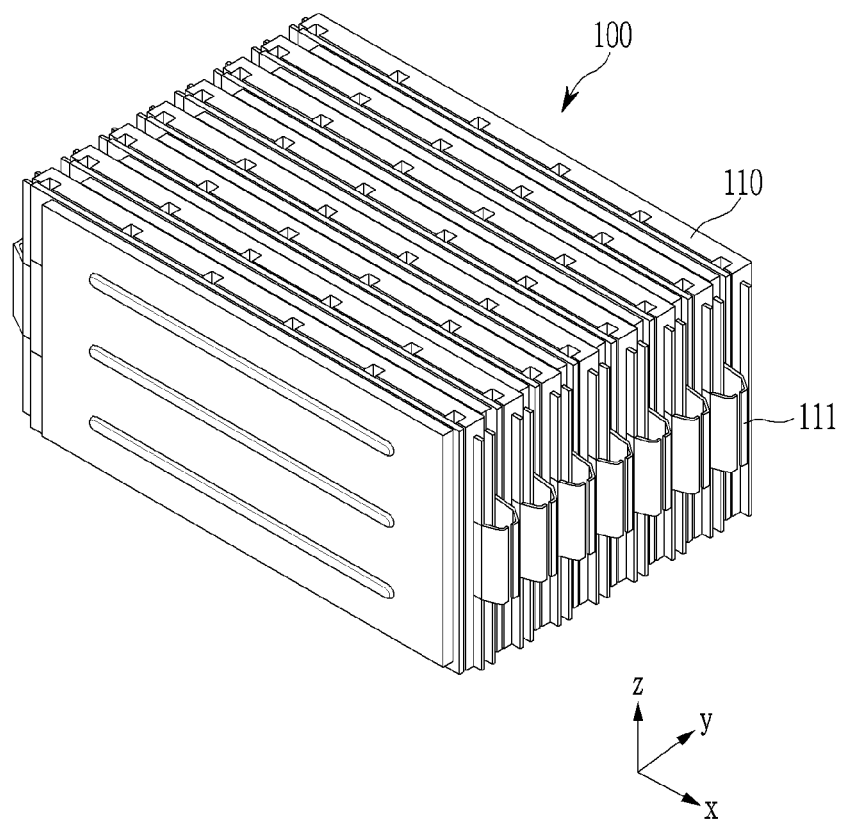
FIG. 2 illustrates a perspective view of a cell assembly housed in the battery module shown in FIG. 1.

FIG. 1 is a perspective view schematically showing a configuration of a battery module, and FIG. 2 is a perspective view showing a cell assembly housed in the battery module shown in FIG. 1.

As shown in FIG. 1, a battery module 1 according to an embodiment includes a lower housing 2 in which a cell assembly 100 shown in FIG. 2 is housed, and an upper housing 3 coupled to the lower housing 2 to cover the cell assembly 100. The battery module 1 may further include a first side cover 4 and a second side cover 5 disposed on opposite sides of the lower housing 2 and the upper housing 3.

As shown in FIG. 2, the cell assembly 100 is an assembly of secondary batteries including a plurality of secondary battery cells 110, and the secondary battery cells 110 may be pouch-type cells and may be arranged in one direction, for example, along a y-axis direction.

Each secondary battery cell 110 includes an electrode lead 111. The electrode lead 111 may include a positive electrode lead and a negative electrode lead. Here, each of the electrode leads 111 is formed to have a plate shape as shown in FIG. 2, and protrudes to the outside of a pouch exterior member of each secondary battery cell 110. In the present embodiment, the electrode lead 111 of each secondary battery cell protrudes in an x-axis direction, and an end portion thereof may be bent to a left or right side (i.e., in the y-axis direction). The electrode lead 111 that is bent in the left (or right) direction may directly contact an electrode lead 111 of another secondary battery cell that is adjacent thereto and bent in the right (or left) direction. The two electrode leads 111 that directly contact each other may be fixed to each other through welding or the like, and thus the secondary batteries of the cell assembly 100 may be electrically connected to each other.

The cell assembly 100 may include a cartridge (not shown) for arranging a plurality of secondary battery cells 110. The cartridge is a constituent element used to arrange the secondary battery cells 110, and which may prevent the secondary battery cells 110 from freely moving by holding the secondary battery cells 110 and may guide the arrangement of the plurality of secondary battery cells 110. Such a cartridge may have a square ring shape with an empty central portion. In such a case, four corners of the cartridge may be disposed on an outer peripheral portion of the secondary battery.

A connector 20 is fixed to at least one of the lower housing 2 and the upper housing 3. In the present embodiment, the connector 20 is detachably fixed to one of outer surfaces of the upper housing 3, but the present invention is not limited thereto.

Figure 3:
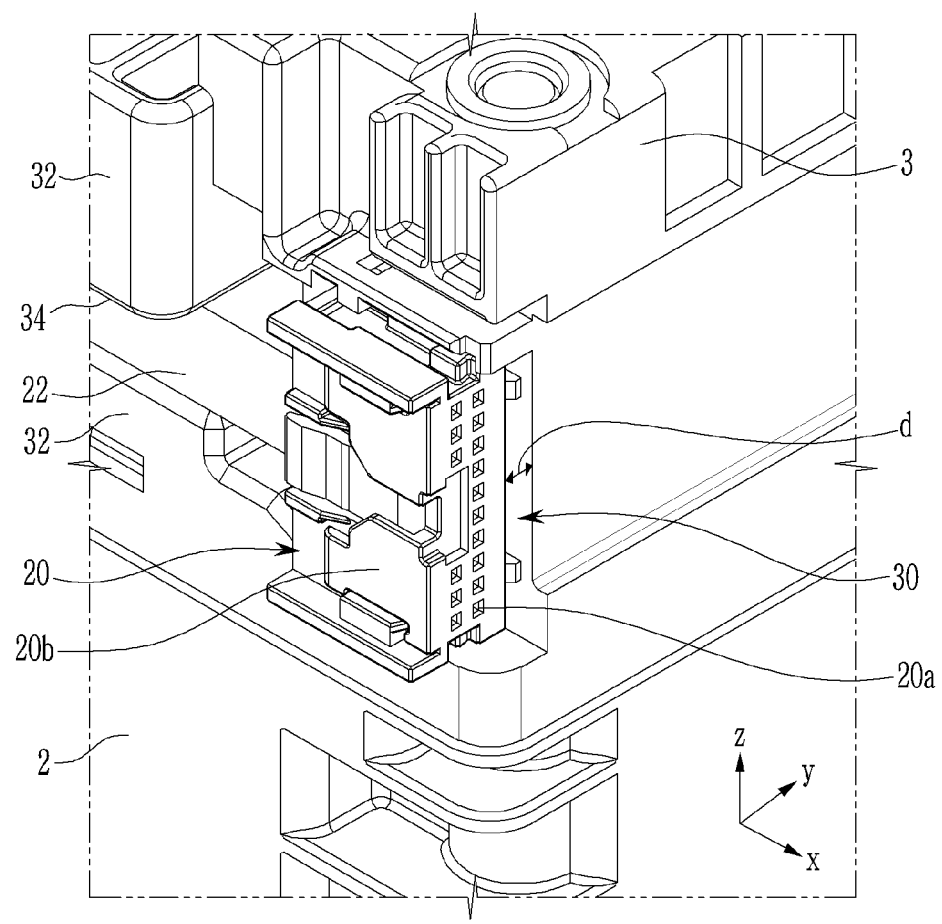

In the present embodiment, the connector 20 is provided as a female connector including a body 20b in which a plurality of terminals 20a are disposed, as shown in FIG. 3, and one end of a wiring harness 22 is detachably connected to the connector 20. Another end of the wiring harness 22 may be connected to a bus bar assembly (not shown), for example, to be electrically connected to the secondary battery cell 110.

As shown in FIG. 3, the connector 20 is fixed to the upper housing 3 in a floating state while being spaced apart from an outer surface of the upper housing 3 by a predetermined distance d. More specifically, in the connector 20, a bottom surface of the body 20b is kept away from an outer surface of the upper housing 3, and opposite sides of the body 20b are coupled to the upper housing 3 by being fixed to the upper housing 3. Accordingly, a space 30 having a predetermined size may be provided between the bottom surface of the body 20b of the connector 20 and the outer surface of the upper housing 3.

Figure 4:
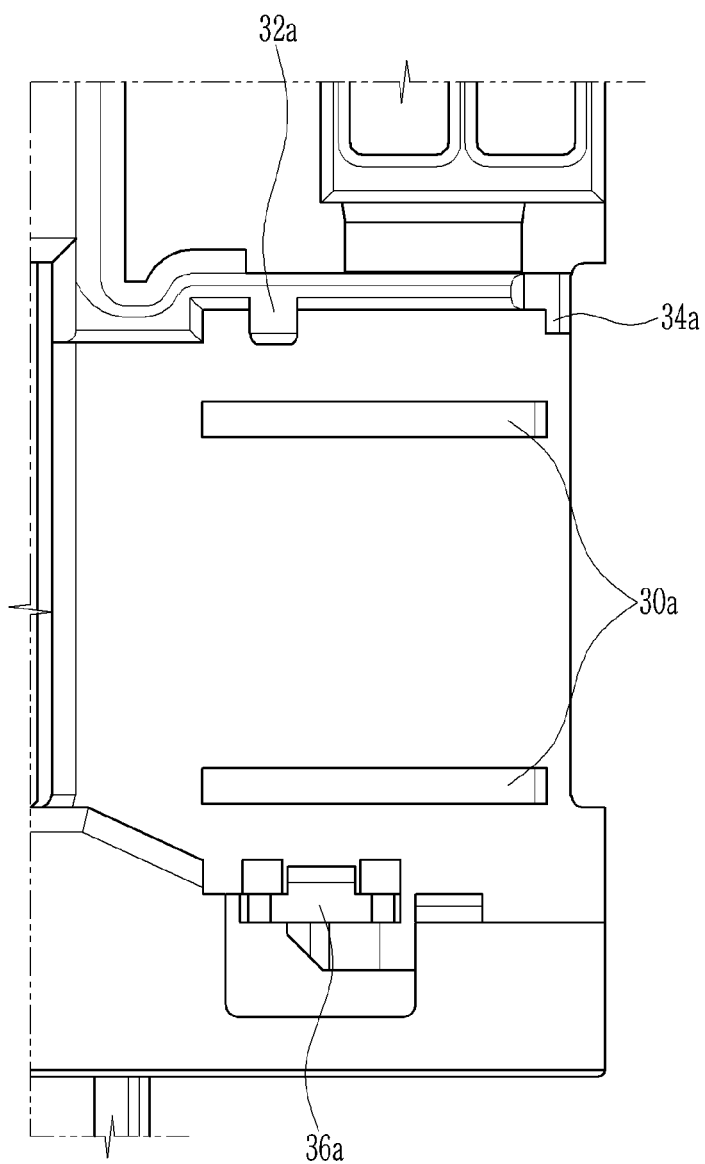
FIG. 4 illustrates a side view of an upper housing for explaining a portion in which a connector is coupled to the upper housing according to an embodiment of the present invention.

FIG. 4 illustrates a side view of the upper housing 3 for explaining a portion in which the connector 20 is coupled to the upper housing 3. As shown in the drawing, two straight protruding portions 30a may be arranged at an arbitrary interval on the outer surface of the upper housing 3 corresponding to the bottom surface of the body 20b of the connector 20. Thus, when the connector 20 is coupled to the upper housing 3, the protruding portions 30a may be in close contact with the bottom surface of the body 20b of the connector 20 to support the connector 20. The space 30 may be formed between the bottom surface of the body 20b of the connector 20 and the outer surface of the upper housing 3 except at the protruding portions 30a. The protruding portions 30a may have a predetermined length in consideration of a coupling relationship with an inspecting jig to be described later. In the present invention, the shape, arrangement, and number of protruding portions are not limited to the examples shown in the drawings, but may be appropriately changed according to the coupling relationship of the inspecting jig.

Figure 5:
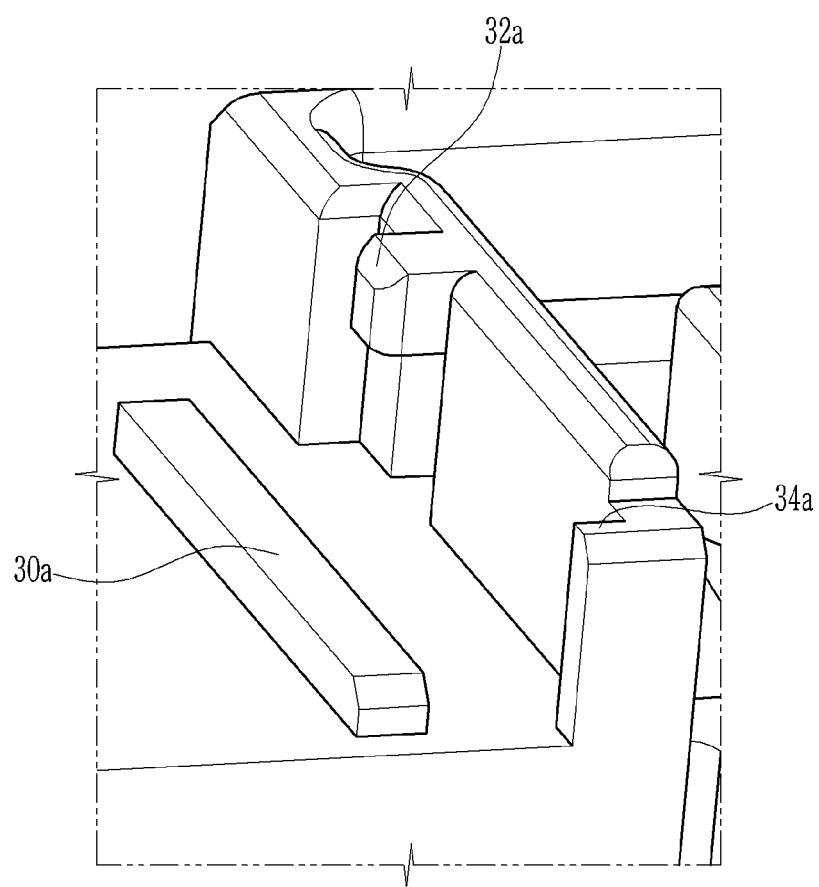
FIG. 5 illustrates a partial perspective view for explaining a catching protrusion of an upper housing at a portion in which a connector is coupled to the upper housing according to an embodiment of the present invention.
Figure 6:
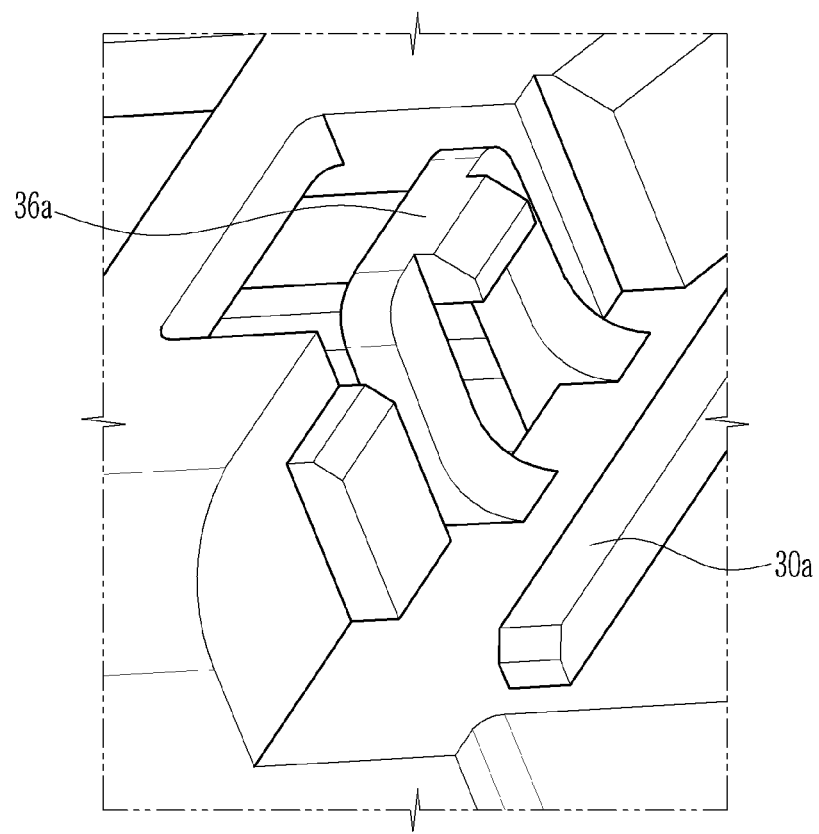
FIG. 6 illustrates a partial perspective view for explaining an elastic hook of an upper housing at a portion in which a connector is coupled to the upper housing according to an embodiment of the present invention.

A first catching protruding portion 32a and a second catching protruding portion 34a, which are adjacent to one protruding portion 30a, are disposed on the outer surface of the upper housing 3 (see FIG. 5). An elastic hook 36a is disposed to protrude from the outer surface of the upper housing 3 adjacent to another protruding portion 30a (see FIG. 6).

When the connector 20 is fixed to the outer surface of the upper housing 3, the first catching protruding portion 32a and the second catching protruding portion 34a are engaged with a first catching jaw 22a provided on a first side surface of the body 20b of the connector 20 and a corner portion 21a of the connector 20, and the elastic hook 36a is engaged with a second catching jaw 24a provided on a second side surface of the body 20b of the connector 20 opposed to the first side surface.

Figure 7:
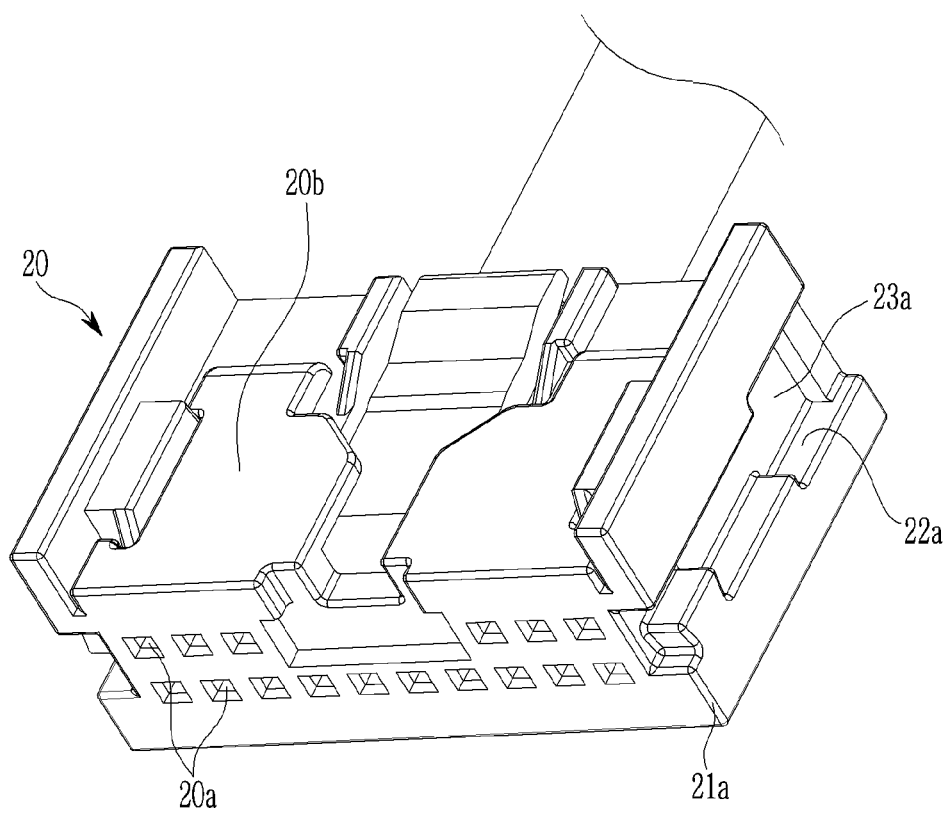
FIG. 7 and FIG. 8 illustrate perspective views for explaining a catching jaw and a groove of a connector at a portion in which the connector is coupled to an upper housing according to an embodiment of the present invention.
Figure 8:
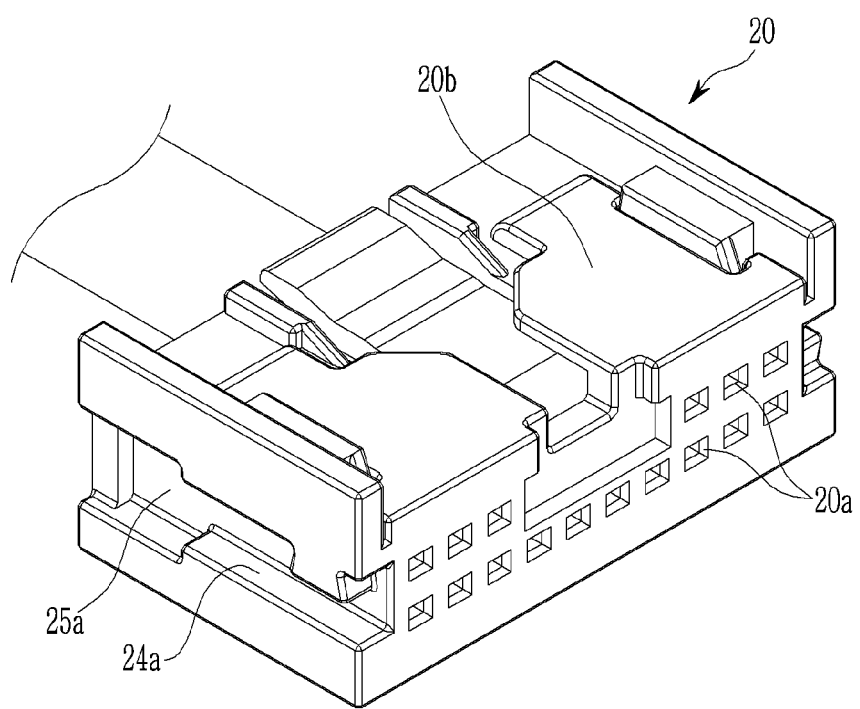

To this end, a first groove 23a is provided on the first side surface of the body 20b of the connector 20 to define the first catching jaw 22a (see FIG. 7), and a second groove 25a is provided on the second side surface of the body 20b of the connector 20 to define the second catching jaw 24a (see FIG. 8) In order to fix the connector 20 to the upper housing 3, the first catching jaw 22a and the corner portion 21a of the first side surface may be engaged and supported by the respective first catching protruding portion 32a and second catching protruding portion 34a of the upper lower housing 3, and the elastic hook 36a may elastically move so that the second catching jaw 24a of the second side surface may be engaged and supported by the elastic hook 36a. In such case, the bottom surface of the body 20b of the connector 20 directly contacts only the protruding portions 30a. Thus, while minimizing the contact area with the outer surface of the upper housing 3, the connector 20 may be fixed to the upper housing 3 or conversely be detached from the upper housing 3 by operation of the elastic hook 36a, which supports one side of the body 20b and elastically moves in the direction towards the other side of the body 20.

In the state in which the connector 20 is fixed to the upper housing 3, the first catching protruding portion 32a may prevent the connector 20 from freely moving in one direction of the connector 20, for example, in a height direction (y-axis direction) of the connector 20 in FIG. 3, and the second catching protruding portion 34a may prevent the connector 20 from freely moving in a direction perpendicular to the one direction, for example, in a longitudinal direction (x-axis direction) of the connector 20.

According to the above-described fixing structure of the connector 20, the connector 20 may be stably and firmly fixed to the upper housing 3 without any separate constituent elements for fixation. In addition, the connector 20 may be fixed to the upper housing 3 while minimizing the contact area with the upper housing 3 and preventing it from freely moving to any direction.

Meanwhile, the wiring harness 22 may be fitted and coupled to a concave portion 34 provided between convex portions 32 provided in the upper housing 3.

Figure 9:
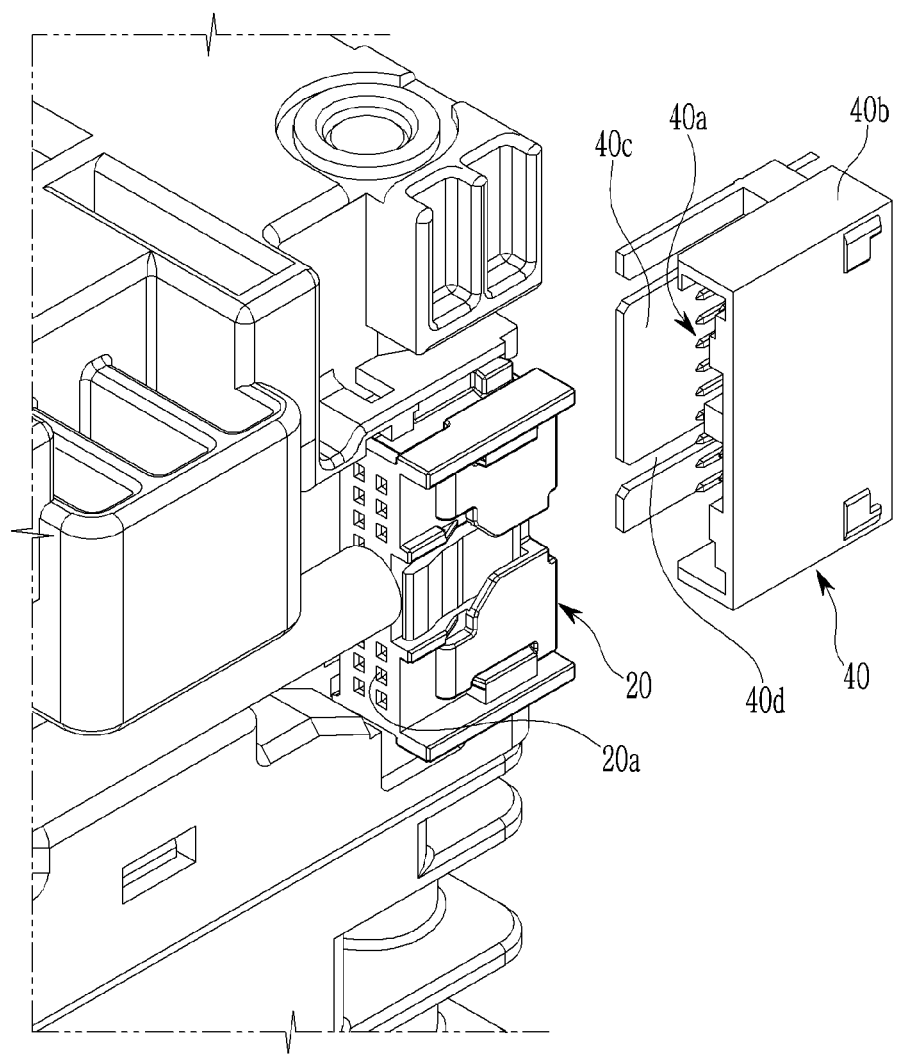
FIG. 9 illustrates a perspective view for explaining a state before an inspecting jig is inserted into a connector according to an embodiment of the present invention.
Figure 10:
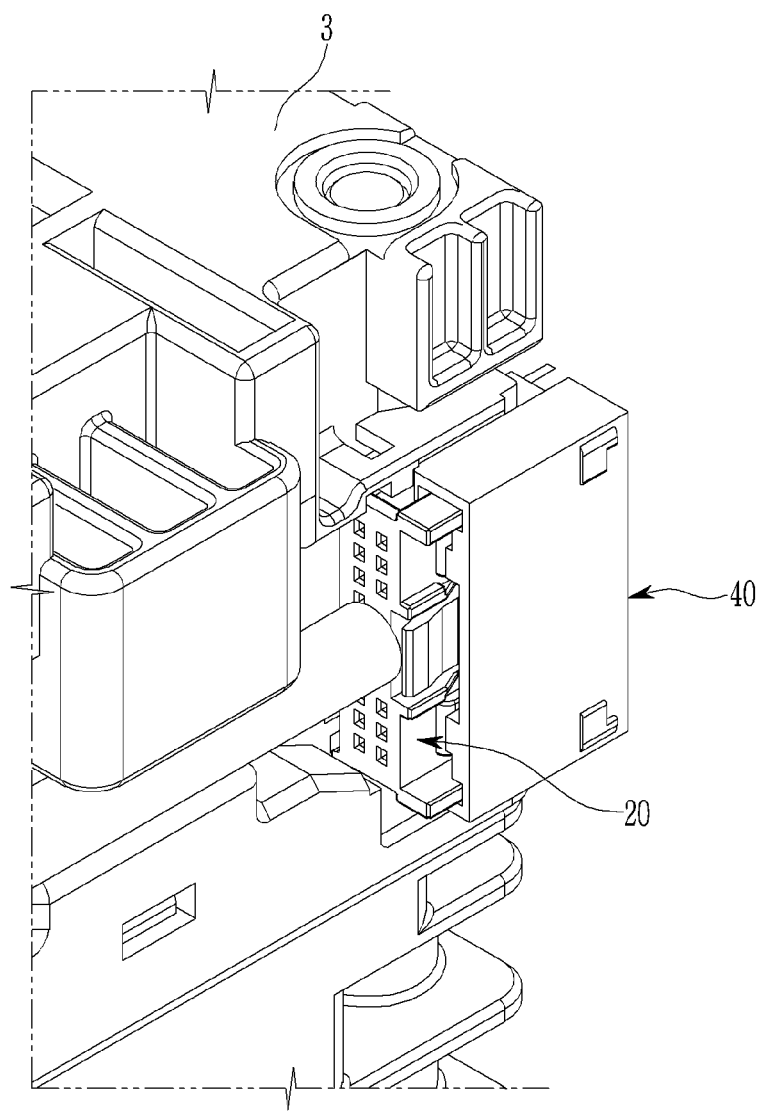
FIG. 10 illustrates a perspective view for explaining a state after an inspecting jig is inserted into a connector according to an embodiment of the present invention.

FIG. 9 illustrates a perspective view of a state before a jig 40 required for automated inspection is inserted into the connector 20 according to an embodiment, and FIG. 10 illustrates a perspective view of a state in which the jig 40 is inserted into the connector 20.

The jig 40 is an inspecting jig connected to a device for inspecting electrical characteristics and the like of the secondary battery cell after the manufacture of the battery module is completed, and only the jig itself is shown in FIG. 9 and FIG. 10 for convenience.

The jig 40 includes a body 40b in which a plurality of pins 40a are arranged for insertion in the terminal 20a of the connector 20, and a bottom plate 40c connected to the body 40b at an arbitrary distance from the body 40b. A recess portion 40d having a predetermined length is disposed on the bottom plate 40c, and the recess portion 40d may have a shape and a number corresponding to those of the protruding portions 30a of the upper housing 30. Accordingly, the recess portions 40d may also be formed in a straight shape, the number of recess portions 40d may be two, and the recess portions 40d may be disposed on the bottom plate 40c to correspond to an interval between the protruding portions 30a.

When inspecting the secondary battery cell, the bottom plate 40c of the jig 40 is coupled with the connector 20 by being moved into the space 30 between the connector 20 and the upper housing 3. In such case, the protruding portions 30a of the upper housing 3 are arranged to fit within the recess portions 40d of the jig 40, while the pins 40a of the jig 40 are arranged to fit into the terminal 20a of the connector 20.

Figure 11:
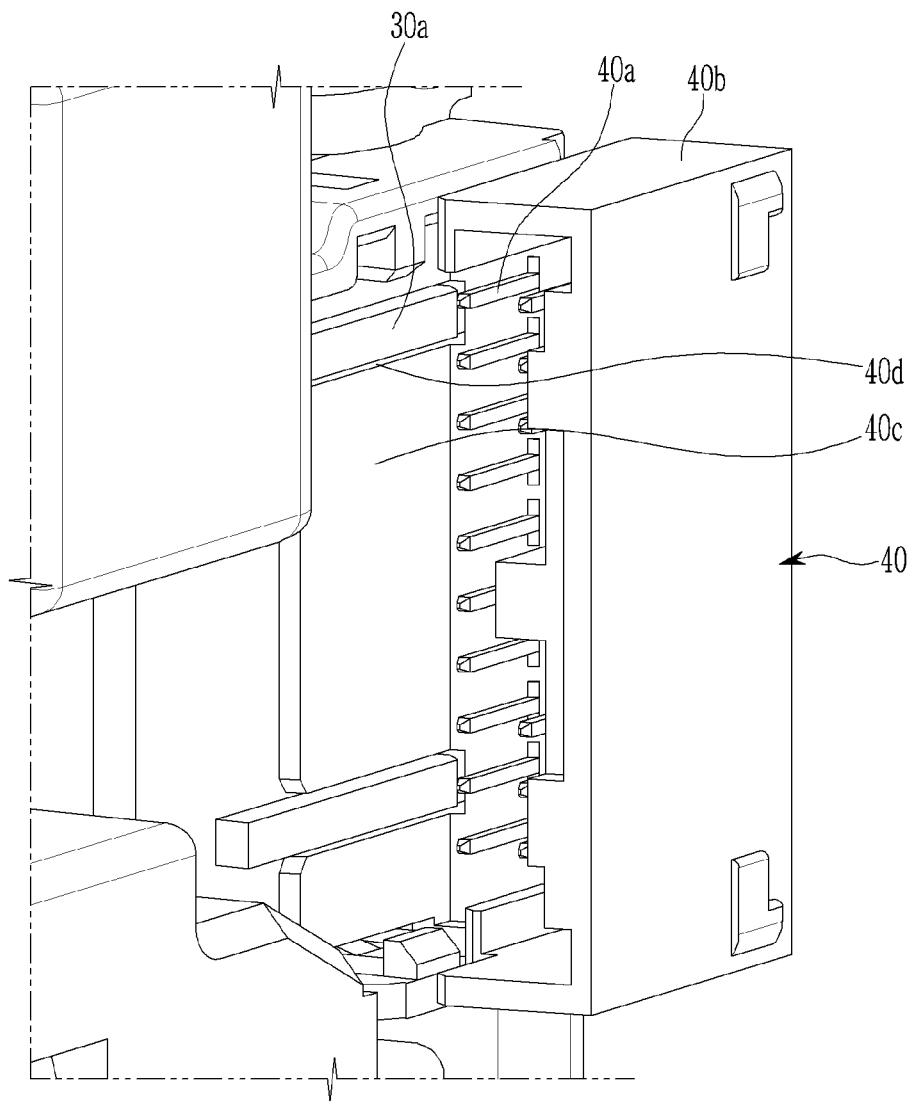
FIG. 11 illustrates a perspective view for explaining a coupling relationship between an inspecting jig and protruding portions of an upper housing in a state in which the inspecting jig is inserted into a connector according to an embodiment of the present invention.

As shown in FIG. 11, when the jig 40 is coupled to the connector 20 so that the protruding portions 30a of the upper housing 3 are completely inserted into the recess portions 40d of the jig 40, the position of the jig 40 is secured, as shown in FIG. 10, and the jig 40 is also stably coupled to the connector 20. This allows the jig 40 to be firmly fixed to the upper housing 3 so that the inspection of the secondary battery cell may be performed. The jig 40 can be detached from the connector 20 after the inspection is completed.

As described above, according to the present embodiment, the female connector may be firmly fixed to the housing without a separate fastening member, and the connector may also be easily and firmly coupled with the inspecting jig when the secondary battery cell is inspected. The invention may thereby improve productivity and reduce production cost by allowing for automated inspection.

In addition, it is also possible to ensure that the connector is securely fixed to the housing, as well as prevent the connector from being detached from the housing due to an external impact or the like during transportation of the battery module.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

| <Description of symbols> | |
|---|---|
| 1: battery module | 110: secondary battery cell |
| 2: lower housing | 3: upper housing |
| 20: connector | 22: wiring harness |
| 20a: terminal | 20b: body |
| 30: space | |

The invention claimed is:

1. A battery module comprising:
a lower housing in which a plurality of secondary battery cells are housed;
an upper housing coupled to a cover of the lower housing to cover the plurality of secondary battery cells;
a female connector detachably installed in at least one of the lower housing and the upper housing; and
a wiring harness electrically connected to a rear side of the connector and to the plurality of secondary battery cells,
wherein the connector includes a body provided with a plurality of terminals accessible at a front side of the connector opposite to the rear side,
wherein a bottom surface of the body extends transverse to the front side, the bottom surface being spaced apart from an outer surface of the at least one housing such that the bottom surface is aligned along and opposed to the outer surface with an open space defined between the outer surface and the bottom surface, and wherein the body is detachably secured to the at least one housing by fixedly coupling opposing first and second side surfaces of the body to the at least one housing.

2. The battery module of claim 1, wherein the at least one housing is the upper housing.

3. The battery module of claim 2, wherein an entirety of the bottom surface of the connector is spaced apart from the outer surface of the upper housing.

4. The battery module of claim 3, wherein the bottom surface of the connector is supported by a protruding portion disposed on the outer surface of the upper housing.

5. The battery module of claim 4, wherein a plurality of the protruding portions are disposed on the outer surface of the upper housing, the protruding portions being spaced apart from one another by an arbitrary distance.

6. The battery module of claim 1, wherein the at least one housing is provided with a concave portion disposed between convex portions, and the wiring harness is fitted within and coupled to the concave portion.

7. The battery module of claim 1, wherein the first and second side surfaces of the body of the connector extend between the front and rear surfaces of the connector in a transverse orientation to the bottom surface.

8. The battery module of claim 2, wherein the first side surface of the body includes a first groove portion defining a first catching jaw, and a first catching protrusion and a second catching protrusion are disposed on the outer surface of the upper housing, the first catching protrusion being supportable by the first catching jaw so as to prevent the connector from moving in one direction, and the second catching protrusion being supportable by a corner of the connector so as to prevent movement of the connector with respect to another direction, perpendicular to the one direction.

9. The battery module of claim 8, wherein the second side surface of the body includes a second groove portion that defines a second catching jaw, the second catching jaw being configured to couple to an elastic hook protruding from the outer surface of the upper housing.

10. The battery module of claim 2, wherein the second side surface of the body includes a second groove portion that defines a second catching jaw, the second catching jaw being configured to couple to an elastic hook of the second securement element, the elastic hook protruding from the outer surface of the upper housing.

11. The battery module of claim 4, wherein the space is adapted to receive a bottom plate of an inspecting jig, and the protruding portion is adapted to be received by a recess portion in the bottom plate, when the inspecting jig is connected to the connector and a pin of the inspecting jig is received within at least one of the terminals of the connector.

12. The battery module of claim 11, wherein the protruding portion is straight.

* * * * *